US008200164B2

(12) United States Patent
Trainin et al.

(10) Patent No.: US 8,200,164 B2
(45) Date of Patent: Jun. 12, 2012

(54) WIRELESS COMMUNICATION SYSTEM, ASSOCIATED METHODS AND DATA STRUCTURES

(75) Inventors: Solomon Trainin, Haifa (IL); Gal Basson, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1096 days.

(21) Appl. No.: 11/292,909

(22) Filed: Dec. 1, 2005

(65) Prior Publication Data

US 2007/0129018 A1 Jun. 7, 2007

(51) Int. Cl.
*H04B 1/00* (2006.01)
*H04B 7/00* (2006.01)

(52) U.S. Cl. ........... 455/69; 455/68; 455/450; 455/441; 455/101; 370/338; 370/342; 370/349; 370/389; 370/393; 375/267; 375/347

(58) Field of Classification Search .............. 455/69, 455/441, 101, 450, 68; 370/338, 441, 442, 370/342; 375/267, 347; 348/14.09
See application file for complete search history.

(56) References Cited

U.S. PATENT DOCUMENTS

| | | | | |
|---|---|---|---|---|
| 5,862,132 A * | 1/1999 | Blanchard et al. | | 370/342 |
| 5,912,887 A * | 6/1999 | Sehgal | | 370/354 |
| 6,144,711 A * | 11/2000 | Raleigh et al. | | 375/347 |
| 6,778,612 B1 * | 8/2004 | Lozano et al. | | 375/299 |
| 7,280,625 B2 * | 10/2007 | Ketchum et al. | | 375/343 |
| 7,366,245 B2 * | 4/2008 | Li et al. | | 375/260 |
| 7,369,511 B2 | 5/2008 | Utsunomiya et al. | | |
| 7,417,974 B2 * | 8/2008 | Hansen | | 370/334 |
| 7,486,720 B2 * | 2/2009 | Molisch et al. | | 375/219 |
| 7,493,664 B2 * | 2/2009 | Riccobon | | 4/420.4 |
| 7,508,778 B2 * | 3/2009 | Yafuso | | 370/282 |
| 7,522,555 B2 * | 4/2009 | Li et al. | | 370/329 |
| 7,555,053 B2 * | 6/2009 | Trachewsky et al. | | 375/267 |
| 7,564,831 B2 * | 7/2009 | Ihm et al. | | 370/349 |
| 7,564,914 B2 * | 7/2009 | Hansen et al. | | 375/267 |
| 7,719,993 B2 * | 5/2010 | Li et al. | | 370/252 |
| 2004/0229653 A1 | 11/2004 | Chotkowski et al. | | |
| 2005/0037799 A1 * | 2/2005 | Braun et al. | | 455/525 |
| 2006/0094373 A1 * | 5/2006 | Hottinen | | 455/73 |
| 2006/0111129 A1 * | 5/2006 | Ihm et al. | | 455/466 |
| 2006/0146725 A1 * | 7/2006 | Li et al. | | 370/252 |
| 2006/0165008 A1 | 7/2006 | Li et al. | | |
| 2006/0291544 A1 * | 12/2006 | Fischer et al. | | 375/219 |
| 2007/0104129 A1 * | 5/2007 | Yang et al. | | 370/329 |

(Continued)

FOREIGN PATENT DOCUMENTS

JP 2005-198213 7/2005

(Continued)

OTHER PUBLICATIONS

Gast, Matthew: "802.11 Wireless Networks: The Definitive Guide, Second Edition", pp. 311-342, XP002414302 (retrieved from the Internet: http://oreilly.com/catalog/802dot1 12 on Jan. 11, 2007).

(Continued)

*Primary Examiner* — Marceau Milord
(74) *Attorney, Agent, or Firm* — Shichrur & Co.

(57) ABSTRACT

A wireless device, a system and a method to establish a wireless communication channel with one or more remote device(s) by generating and/or receiving a protocol data unit(s) (PDU) including a control field including one or more of link adaptation control information, calibration control information and feedback request information.

19 Claims, 2 Drawing Sheets

U.S. PATENT DOCUMENTS

2007/0104288 A1* 5/2007 Kim .............................. 375/267
2008/0005219 A1 1/2008 Nabar et al.
2009/0086690 A1 4/2009 Gu et al.

FOREIGN PATENT DOCUMENTS

| | | | |
|---|---|---|---|
| JP | 2005-198213 | A | 7/2005 |
| JP | 2005-198213 | A | 7/2005 |
| WO | 03/059353 | A1 | 6/2003 |

OTHER PUBLICATIONS

Punnoose, R. J., et al., "Communications Resources Management for Advanced Telematics Applications" 2001 IEEE Intelligent Transportations Systems Conference Proceedings Aug. 25-29, 2001, Piscataway, NJ, USA, IEEE, pp. 1056-1060, Aug. 2001, XP010555921 ISBN:0-7803-7194-1.

Xia, P., et al., "Multiantenna Adaptive Modulation With Beamforming Based on Bandwidth Constrained Feedback" IEEE Tarnsactions on Communications, IEEE Service Center, Piscataway, NJ, US, vol. 53, No. 3, pp. 526-536, Mar. 2005, XP001227565 ISSN: 0090-6778.

3GPP TSG RAN WG1 31:"Tdoc R1-03-0286 Text proposal on CQI Enhancements for TR on HSDPA Enhancements" TSG-RAN WG1 #31, Feb. 2003, pp. 1-7, XP002312853.

Office Action of U.S. Appl. No. 11/645,789 dated Dec. 14, 2009.

Office Action of U.S. Appl. No. 11/645,789, mailed on Jul. 23, 2009.

"IEEE P802.11n/D1.0 Draft Amendment to Standard [FOR] Information Technology—Telecommunications and information exchange between systems—Local and Metropolitan networks—Specific requirements-Part 11: Wireless LAN Medium Access Control (MAC) and Physical Layer (PHY) Specifications: Enhancements for Higher Throughput" 2006, the IEEE, New-York, NY, USA; p. i-vii & p. 1-328.

Eklund, C et al. "IEEE Standard 802.16: A Technical Overview of the WirelessMAN Air Interface for Broadband Wireless Access" 2002, the IEEE, New-York, NY, USA; pp. 98-107.

"IEEE P802.16e/D9 Draft IEEE Standard for Local and Metropolitan Area Networks Part 16: Air Interface for Fixed and Mobile Broadband Wireless Access Systems Amendment for Physical and Medium Access Control Layers for Combined Fixed and Mobile Operation in Licensed Bands" 2005, the IEEE, New-York, NY, USA; p. i-xxvi & p. 1-630.

Notification of Reason(s) for Refusal for JP P2008-535805 mailed on Feb. 7, 2011.

Matthew Gast, 802.11 Wireless Networks: The Definition Guide, Second Edition, Apr. 2005, pp. 311-342.

Ratish J. Punnoose, et al., Communications Resources Management for Advanced Telematics Applications, Proceedings of the 2001 IEEE Intelligent Transportation Systems Conference, Aug. 25, 2001, pp. 1056-1060.

Office Action for CN 200680039913.8 Mailed on Jun. 2, 2011.

Matthew S. Gast, "802.11 Wireless Networks, The Definitive Guide, Second Edition", pp. 325-340, Apr. 30, 2005.

Office Action for CN 200680039913.8 Mailed on Sep. 26, 2011.

Office Action for U.S. Appl. No. 11/645,789 mailed on Oct. 21, 2011.

Office Action Received for Chinese Patent Application No. 200680039913.8 Mailed Nov. 12, 2010, 3 pages of Office Action and 2 pages of English Translation.

International Preliminary Report on Patentability Received for PCT application No. PCT/US2006/045698, mailed on Jun. 12, 2008, 13 pages.

Office Action Received for European Patent Application No. 06838583.0, Mailed on Dec. 15, 2008, 3 pages.

Notification of Reason(s) for Refusal for JP P2008-535805 mailed on Jul. 19, 2011.

* cited by examiner

WIRELESS COMMUNICATION SYSTEM, ASSOCIATED METHODS AND DATA STRUCTURES

TECHNICAL FIELD

Embodiments of the invention are generally directed to communication systems and, more particularly, to an apparatus, methods and data structures to exchange channel state information in a wireless communication system.

BACKGROUND

Performance improvement in wireless communication systems may be achieved if the channel charactersitics are known by the transmitter, or source, of a wireless communication signal. Conventional techniques for providing the transmitter with information associated with such channel characteristics suffer many implementation-centric limitations, which limit their practicality. An improved apparatus, methods and associated data structures overcoming at least is one of these practical limitations is provided in the disclosure, below.

BRIEF DESCRIPTION OF THE DRAWINGS

Embodiments of the present invention are illustrated by way of example, and not by way of limitation, in the figures of the accompanying drawings in which like reference numerals refer to similar elements and in which.

DETAILED DESCRIPTION

Figure 1:
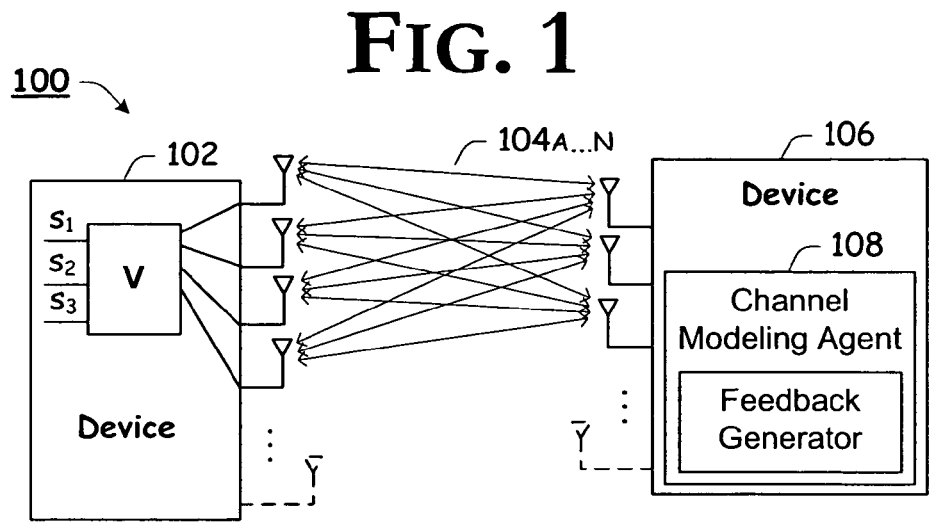
FIG. 1 is a block diagram of an example communication system within which embodiments of the invention may be practiced.

Embodiments of a wireless communication system, methods and associated data structures is disclosed herein. More specifically, embodiments of a system, apparatus, methods and associated data structures to enable the request and/or feedback of channel state information (CSI).

According to one embodiment described more fully below, one or more data structures are introduced, e.g., for use in physical layer (PHY) and/or Media Access Control (MAC) communication messages. For example, according to one embodiment described more fully below, one or more of a high throughput (HT) control field, a link adaptation control field, a feedback request field, a multiple input multiple output (MIMO) channel measurement quality of service (QoS) data and high throughput control (HTC) frame, a reciprocity correction QoS data and HTC frame, and/or a CSI feedback QoS data and HTC frame are generally introduced. Moreover, with the support of such data structures, an innovative CSI feedback mechanism that enables the exchange of feedback information in support of at least dynamic link adaptation and/or transmit beamforming is presented.

According to one embodiment, the channel modeling agent (CMA) with a feedback generator is implemented in a communications device which may implement one or more features introduced above, although the invention is not limited in this regard. As developed more fully below, the CMA may be engaged by a host communications device to enable the exchange of channel state information (CSI) with a remote communications device using, e.g., one or more of the innovative data structures introduced above. According to one embodiment, the CMA may be invoked to determine channel state information associated with a wireless communication channel established with at least one other (remote) communications device(s).

According to one embodiment, a communications device may implement a feedback generator to facilitate the communication of information associated with the determined CSI with at least a subset of the remote one or more communication device(s). According to one embodiment, the innovative data structures introduced above may be employed by the feedback generator to initiate, respond or convey information associated with such CSI.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Technical detail regarding some of the operating characteristics of the mobile devices and/or the wireless communication network(s) in which the CGA may be implemented may be found in, e.g., the IEEE 802.11, 1999 Edition; Information Technology Telecommunications and Information Exchange Between Systems—Local and Metropolitan Area Networks—Specific Requirements, Part 11: WLAN Medium Access Control (MAC) and Physical (PHY) Layer Specifications, its progeny and supplements thereto (e.g., 802.11a, .11g and .11n). See, also, the IEEE Std 802.16-2001 IEEE Std. 802.16-2001 IEEE Standard for Local and Metropolitan area networks Part 16: Air Interface for Fixed Broadband Wireless Access Systems, its progeny and supplements thereto (e.g., 802.16a, .16d, and .16e).

Example Communications Environment

In FIG. 1, a block diagram of an example wireless communication environment 100 is depicted within which embodiments of the invention may well be practiced. In accordance with the illustrated example embodiment of FIG. 1, an example communications environment 100 is depicted comprising one wireless communications device 102 in communication with another wireless communications device 106 through a wireless communication link 104. As used herein, communication environment 100 is intended to represent any of a wide range of wireless communication networks including, but not limited to, a near-field communication (NFC) network, a wireless local area network (WLAN), a wireless metropolitan area network (WMAN), a cellular radiotelephony network, a personal communication system (PCS) network, and the like.

According to one embodiment, communication network 100 may be an 802.11x and/or an 802.16x communication network, where device 102 may be an access point (or, base station) while device 106 may be a subscriber station (or, end user device), although the scope of the invention is not limited in this regard. As shown, one or more of device(s) 102, 106 may include multiple transmit and/or receive chains representing a multiple input multiple output (MIMO) communications system.

In a closed-loop MIMO (or, beamforming) system a data signal is modified by a beamforming matrix V, and then selectively transmitted by a plurality of antennae to a remote receiver. According to one embodiment, the data signal may comprise a number of data streams ($N_1 \ldots N_s$), although the invention is not limited in this regard. The number of data streams may represent the number of spatial channels, with appropriate bit-loading, power weighting and subcarrier assignments, although the invention is not limited in this regard.

According to one embodiment, with four (4) transmit antennae and three (3) data streams (for ease of illustration), the transmitted signal (x) transmitted via the $N_t$ antennae may be represented as:

$$x = V \times s \quad (1)$$

$$\text{where } V = \begin{bmatrix} v_{11} & v_{12} & v_{13} \\ v_{21} & v_{22} & v_{23} \\ v_{31} & v_{32} & v_{33} \\ v_{41} & v_{42} & v_{43} \end{bmatrix}, \text{ and } s = \begin{bmatrix} s_3 \\ s_2 \\ s_3 \end{bmatrix}$$

As shown, s is an $N_s$-vector of data symbols, and V is the $N_t$ by $N_s$ beamforming matrix developed from information (e.g., matrix codebook(s) and or indices thereto) fed back from a remote receiver. According to one embodiment, the beamforming matrix V is typically unitary, and power/bit loading is applied on vector s, as introduced above.

Device 106 is depicted comprising a channel modeling agent (CMA) 108 to dynamically generate a model of the wireless communication channel, e.g., by measuring one or more channel characteristics. According to one embodiment, channel state information (CSI) depicting one or more elements of the channel model and/or the channel characteristics may be generated by CMA 108.

According to one embodiment, a feedback generation mechanism (e.g., feedback generator) may be invoked to support the communication of the channel state information to other, remote, communication device(s). According to one embodiment described more fully below, the feedback generation mechanism may utilize or more of the data structures introduced above to request, respond and/or convey channel state information, e.g., in support of dynamic link adaptation, beam forming, etc. According to one embodiment, one or more of such data structures may be implemented within the physical layer convergence protocol (PLCP), e.g., within PLCP protocol data unit(s) (PPDU), although the invention is not limited in this regard.

It will be appreciated that but for the introduction of the CMA 108 and/or the feedback generation mechanism, device 106 is intended to represent any of a wide variety of electronic device(s) with wireless communication capability. In some embodiments, CMA 108 may well be implemented within a receiver element of a device, e.g., in a baseband and/or applications processor of the receiver. Similarly, the feedback generation mechanism may be implemented in hardware, software and/or firmware while the data structures may be invoked in PHY or MAC layer communications, although the scope of the claimed invention is not limited in this regard.

Example Operation

Figure 2:
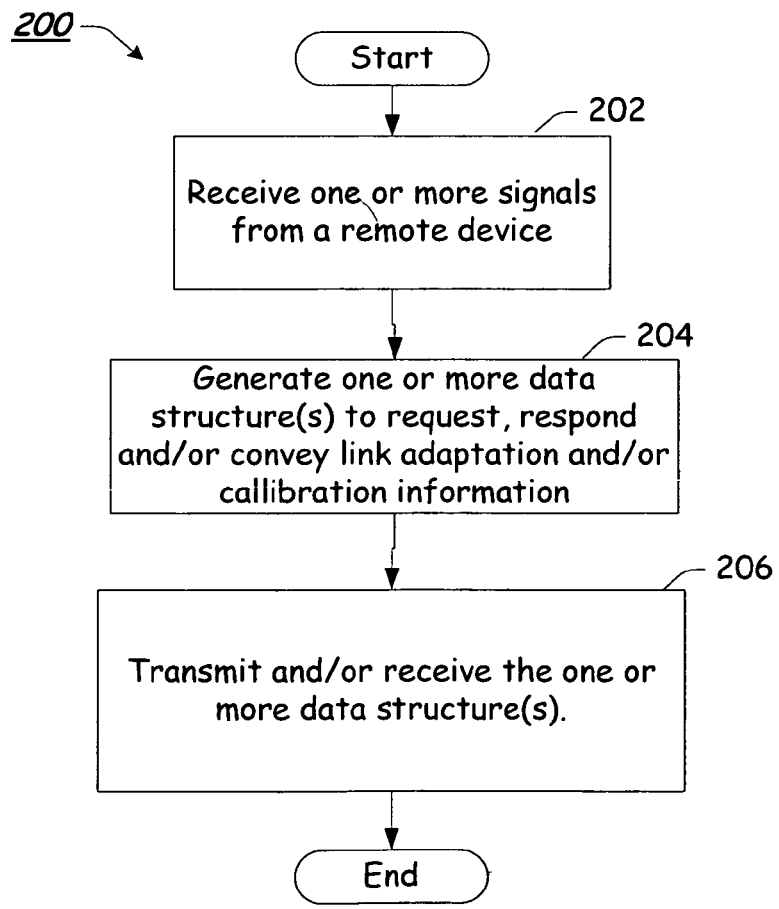
FIG. 2 is a flow chart of an example method for the exchange of channel state information, according to but one example embodiment.

Turning to FIG. 2, a flow chart of an example method for CSI feedback is generally presented, according to one embodiment. As shown, the method begins with block 202 wherein a communications device (e.g., 106) receives one or more communications signal(s) from one or more remote transmitter(s) (e.g., 102).

In block 204, the communications device (e.g., 106) invokes a channel modeling agent (e.g., 108) that may measure one or more characteristics of at least a subset of the received signal(s). According to one embodiment, the communications device (e.g., 106) may request, respond and/or convey channel state information (e.g., associated with the information generated by the CMA 108, and/or equivalent information generated at remote device(s)) from/to one or more remote devices, e.g., utilizing the data structures introduced above.

More particularly, the feedback generator mechanism may utilize one or more of the following data structures in support of the request, response and/or exchange of channel state information, according to one example embodiment.

HT Control Field

According to one embodiment, an HT Control (HTC) field may be included in any HT frame except a non-QoS Data frame. The presence of the HT control field in frames carried in a HT physical layer convergence procedure (PLCP) protocol data unit (PPDU) may be indicated by setting an order bit in a MAC header. According to one embodiment, the HT Control Field is last in the MAC Header. A MAC protocol data unit (MPDU) that contains the HT control field may be referred to as an +HTC frame. An example format of 4-octet HT Control Field is shown in the following table:

TABLE

Example HT Control field format

| B0-B15 Link Adaptation Control | B16-19 Calibration Control | B20-21 Feedback request | B22-31 Reserved |
|---|---|---|---|
| #Bits 16 | 4 | 2 | 10 |

TABLE

Link Adaptation Control field

| | B0 XT | B1 TRQ | B2 MRQ | B3-B5 MRS | B6-B8 MFS | B9-15 MFB |
|---|---|---|---|---|---|---|
| #Bits | 1 | 1 | 1 | 3 | 3 | 7 |

Subfields of the Link Adaptation Control Field May Include:

TABLE

Link Adaptation Control Subfields

| Field | Meaning | Definition |
|---|---|---|
| XT | Extension | '1' = body of QOS data + HTC is used for calibration or CSI feedback. |
| TRQ | Sounding Request | '1' = Request to responder to transmit a sounding PPDU |
| MRQ | MCS Request | '1' = Request for MCS feedback |
| MRS | MRQ Sequence Identifier | Set by sender to any value in the range '000'-'110' to identify MRQ. Invalid if MRQ = '0' |
| MFS | MFB Sequence Identifier | Set to the received value of MRS. See note. Set to '111' for unsolicited MFB Also, set to '111' when MFB is all-ones |
| MFB | MCS Feedback | Link adaptation feedback containing recommended MCS Default "all-ones" value indicates no feedback or not available |

According to one embodiment, the Feedback Request field may contain position of the CSI feedback

TABLE

Feedback Request format

| Field | Meaning | Definition |
| --- | --- | --- |
| Feedback request | Position of the CSI feedback | 00 = Default: Unsolicited feedback allowed<br>01 = Immediate CSI feedback (SIFS after PPDU that contains Request)<br>10 = CSI feedback aggregated with any other response in the same TxOP<br>11 = Reserved |

MIMO Channel Measurement QoS data +HTC Frame

According to one embodiment, MIMO Channel Measurement is QoS data +HTC frame. Acknowledge (ACK) policy field in the QoS control field may be set to the Normal acknowledgement. The Extension of the HT Control filed may be set. The format of frame body may be derived from the management action frame. This frame may be of category Transmit Beamforming. It may contain one or more of the following fields:

TABLE

MIMO Channel Measurement

| Order | Information | Name | Size | Value |
| --- | --- | --- | --- | --- |
| 1 | Category | TxBF | 1 | 6 |
| 2 | Action | MIMO Channel Measurement Report | 1 | 0 |
| 3 | Transmit Beamforming Control | Transmit Beamforming Control | 2 | See text. |
| 4 | MCMR Segment Sequence | MCMR Segment Sequence | 1 | See text |
| 5 | MIMO Channel Measurement Report | MIMO Channel Measurement Report | 3 × Ns × Ni × Nr | See text |

Reciprocity Correction QoS data +HTC Frame

According to one example embodiment, Reciprocity Correction is QoS data +HTC frame. According to one embodiment, the Ack policy field in the QoS control field may be set to the Normal acknowledgement. The Extension of the HT Control filed shall be set. The format of frame body may be derived from the management action frame. Reciprocity Correction may be of category Transmit Beamforming. According to one embodiment, the reciprocity correction frame may contain one or more of the following fields.

TABLE

Reciprocity Correction

| Order | Information | Name | Size | Value |
| --- | --- | --- | --- | --- |
| 1 | Category | TxBF | 1 | 6 |
| 2 | Action | Reciprocity Correction | 1 | 1 |
| 3 | Transmit Beamforming Control | Transmit Beamforming Control | 2 | See text. |
| 4 | Reciprocity Correction Vector | Reciprocity Correction Vector | 3 × Ns × Nr | See text |

CSI Feedback QOS data+HTC frame

According to one embodiment, a CSI Feedback frame is introduced. According to one embodiment, the CSI feedback frame may be implemented as a QoS data +HTC frame. According to one embodiment, the following table defines an example Ack policy in the QoS control field. The Extension of the HT Control filed may be set.

TABLE

QoS control Ack Policy for CSI feedback

| Request Mode | Ack policy |
| --- | --- |
| Solicited (in the same TxOP of request) | No Ack |
| Unsolicited (separate access) | Normal Ack |

According to one embodiment, the format of the frame body may be derived from the management action frame. According to one example implementation, the CSI Feedback frame may be of category Transmit Beamforming. It contains at least one or more of the following

TABLE

CSI Feedback

| Order | Information | Name | Size | Value |
| --- | --- | --- | --- | --- |
| 1 | Category | TxBF | 1 | 6 |
| 2 | Action | CSI Feedback | 1 | 2 |
| 3 | Transmit Beamforming Control | Transmit Beamforming Control | 2 | See text. |
| 4 | Vector Quantized CSI Feedback Information | Vector Quantized Explicit Feedback Information | Variable | See text |

CSI Feedback

According to one embodiment, the CSI feedback mechanism introduced herein enables the exchange of explicit feedback for Link Adaptation as well for Transmit beamforming. One example of the basic frame exchange is depicted in FIG. 3, although the scope of the invention is not limited in this regard.

Figure 3:
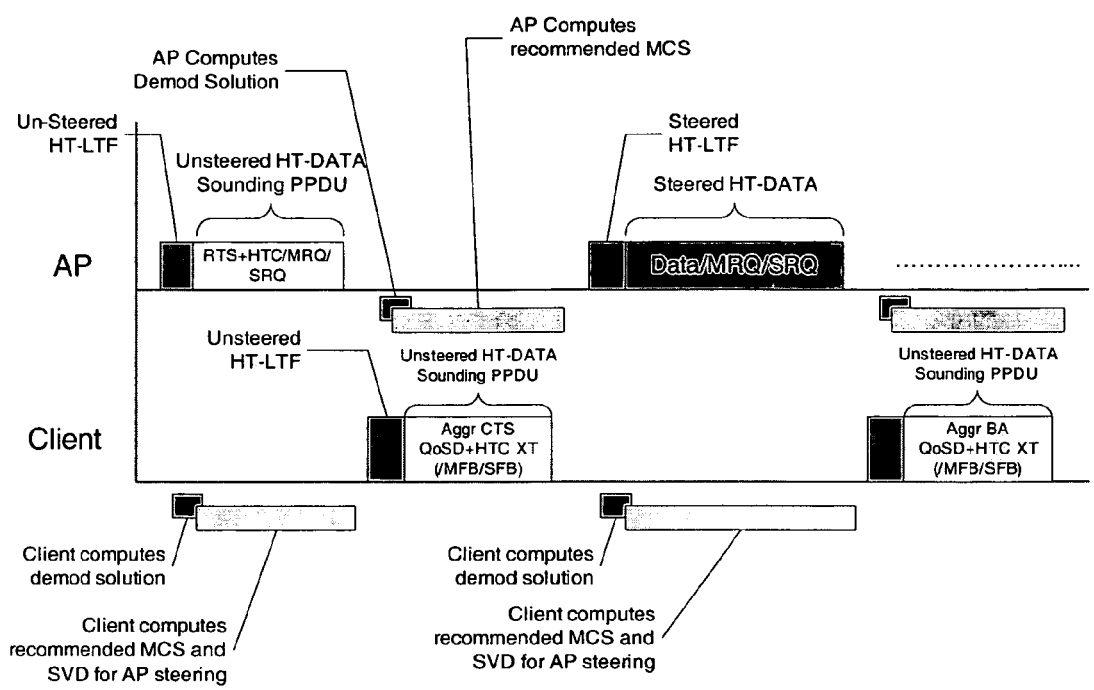
FIG. 3 provides a graphical representations of a communications exchange in accordance with one embodiment.

In accordance with the illustrated example embodiment of FIG. 3, a first communications device (e.g., an access point (AP)) requests and uses the CSI feedback for transmit beamforming. The frame exchange can also accommodate computation of the steering vectors at the initiator. In this case, instead of sending back steering vectors, the responding communication device(s) (e.g., a station (STA)) may return quantized channel estimates to the initiating AP, and the AP will compute the steering vectors, although the invention is not limited in this regard. As in the last case the quantized channel estimates can be used for MCS optimization out of transmit beamforming. According to one example implementation, the type of information returned to CSI feedback requestor is subject of advertised capabilities.

In accordance with the illustrated example embodiment of FIG. 3, an example communication sequence may include:

The sequence is initiated by an AP which sends an unsteered sounding PPDU containing an FRQ (Feedback Request).

The responding client STA uses the sounding packet to make a channel estimate, and computes the SVD and MFB of the channel.

The resulting steering vectors are quantized and returned to the AP in a PPDU containing an MFB and SFB (steering feedback) message.

The AP uses the result to transmit a steered PPDU to the client STA. If the AP has subsequent PPDUs to send in steered mode, this PPDU should also be a sounding PPDU.

Steps 2, 3, and 4 may be repeated for an ongoing beamforming exchange. If latencies cause the channel estimates or steering vectors to get stale, then step one need to be repeated.

Alternate Embodiment(s)

Figure 4:
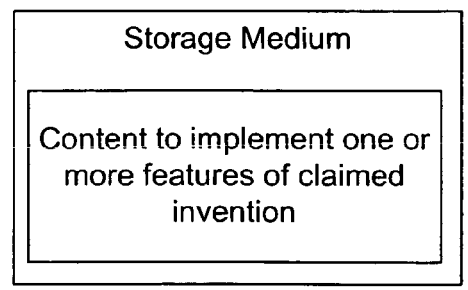
FIG. 4 is a block diagram of an example article of manufacture including content which, when executed by an accessing machine, causes the machine to implement one or more aspects of embodiment(s) of the invention.

FIG. 4 illustrates a block diagram of an example storage medium comprising content which, when invoked, may cause an accessing machine to implement one or more aspects of the channel modeling agent 108, feedback generator mechanism, associated data structures and/or associated methods 200. In this regard, storage medium 400 may include content 402 (e.g., instructions, data structures, or any combination thereof) which, when executed, causes an accessing device to implement one or more aspects of that introduced above.

The machine-readable (storage) medium 400 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Moreover, the present invention may also be downloaded as a computer program product, wherein the program may be transferred from a remote computer to a requesting computer by way of data signals embodied in a tangible carrier wave or other propagation medium via a communication link (e.g., a modem, radio or network connection). As used herein, all of such media is broadly considered storage media.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radio-telephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect. Such devices may well be employed within any of a variety of Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

Certain aspects, or embodiments of the present invention may include various operations and/or data structures. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any number of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

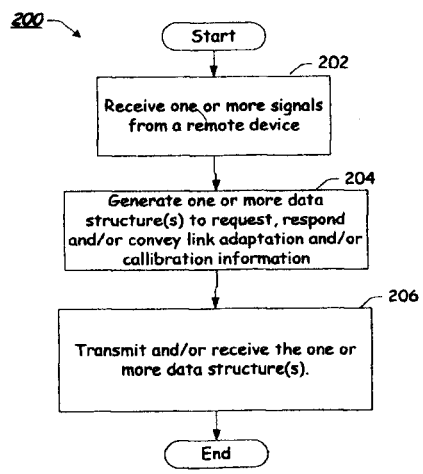

What is claimed is:

1. A wireless communication device comprising:
   a transmitter to establish a wireless communication channel with one or more remote device(s), by using a channel state information (CSI) feedback mechanism that enables the exchange of feedback information in support of at least dynamic link adaptation and/or transmit beamforming, wherein the transmitter is to generate a protocol data unit(s) (PDU) including a control field including a link adaptation control field, a calibration control field and a feedback request field including a position of the CSI feedback to request the feedback information from the one or more remote communications device(s).

2. A wireless communication device according to claim 1, wherein the protocol data unit is a physical layer convergence protocol (PLCP) protocol data unit(s) (PPDU).

3. A wireless communication device according to claim 1, wherein the protocol data unit is a media access control (MAC) layer convergence protocol (MLCP) protocol data unit (MPDU).

4. A wireless communication device according to claim 1, wherein the protocol data unit has a link adaptation control subfield, a calibration control subfield and a feedback request subfield.

5. A wireless communication device according to claim 4, wherein the link adaptation control subfield includes an extension subfield, a sounding request subfield, a MCS request subfield, a MRQ sequence identifier subfield, an MFB sequence identifier subfield and an MCS feedback subfield.

6. A wireless communication device according to claim 1, wherein the position of the CSI feedback includes an indication of a select one of unsolicited feedback allowed, immediate CSI feedback, CSI feedback aggregated with any other response in the same transmit operation (TxOP).

7. A wireless communications device according to claim 1, wherein the transmitter is to generate a frame comprising multiple-input-multiple-output (MIMO) channel measurement information, the frame comprising at least a category field, an action field, a transmit beamforming control field, a MCMR segment frequency field, and a MIMO channel measurement report field.

8. A wireless communication device according to claim 1, wherein the transmitter is to generate a frame comprising reciprocity correction information, the frame comprising at least a category field, an action field, a transmit beamforming control field, and a reciprocity correction vector.

9. A wireless communication device according to claim 8, the action field denoting transmit beamforming and the action field denoting reciprocity correction.

10. A wireless communication device according to claim 1, wherein the transmitter is to generate a frame comprising CSI feedback information, the frame comprising at least a category field, an action field, a transmit beamforming control field, and a vector quantized CSI feedback information field.

11. A wireless communication device according to claim 10, the category field denoting transmit beamforming, the action field denoting CSI feedback, and the vector quantized CSI feedback information field denoting vector quantized explicit feedback information.

12. A method implemented within a wireless communications device comprising:
establishing a wireless communication channel with one or more remote device(s);
generating a protocol data unit (PDU) including a control field including one or more of a link adaptation control subfield, a calibration control subfield, a calibration control subfield and a feedback request subfield, the feedback request subfield including a channel state information (CSI) subfield to enable exchanging of an explicit feedback for a link adaptation and for transmit beamforming; and
transmitting the generated PDU to request, in response to a request, adaptation control information and/or calibration control information.

13. The method of claim 12 further comprising:
generating a frame comprising MIMO channel measurement information, the frame comprising at least a category field, an action field, a transmit beamforming control field a MCMR segment sequence field and a MIMO channel measurement report field; and
transmitting the generated frame to a remote communication device.

14. The method of claim 12 further comprising:
generating a frame comprising reciprocity correction information, the frame comprising at least a category field, an action field, a transmit beamforming control field and a reciprocity correction vector; and
transmitting the generated frame to a remote communication device.

15. The method of claim 12 further comprising:
generating a frame comprising channel state information feedback, the frame comprising at least a category field, an action field, a transmit beamforming control field and a vector quantized CSI feedback information field; and
transmitting the generated frame to a remote communication device.

16. A wireless communication system comprising:
one or more antennas through which a wireless communication channel is established; and
a transmitter, coupled to at least a subset of the one or more antennas, to establish a wireless communication channel with one or more remote device(s), to generate a protocol data unit(s) (PDU) including a control field including one or more of link adaptation control information, calibration control information and feedback request information including channel state information (CSI), wherein the CSI enables the exchange of explicit feedback for a link adaptation and for transmit beamforming.

17. The wireless communication system of claim 16 wherein the transmitter is to generate a frame comprising MIMO channel measurement information, the frame comprising at least a category field, an action field, a transmit beamforming control field, a MCMR segment frequency field, and a MIMO channel measurement report field.

18. The wireless communication system of claim 16 wherein the transmitter is
to generate a frame comprising reciprocity correction information, the frame comprising at least a category field, an action field, a transmit beamforming control field, and a reciprocity correction vector.

19. The wireless communication system of claim 16 wherein the transmitter is
to generate a frame comprising CSI feedback information, the frame comprising at least a category field, an action field, a transmit beamforming control field, and a vector quantized CSI feedback information field.

\* \* \* \* \*

UNITED STATES PATENT AND TRADEMARK OFFICE
CERTIFICATE OF CORRECTION

PATENT NO. : 8,200,164 B2
APPLICATION NO. : 11/292909
DATED : June 12, 2012
INVENTOR(S) : Solomon Trainin et al.

Page 1 of 2

It is certified that error appears in the above-identified patent and that said Letters Patent is hereby corrected as shown below:

The title page showing the illustrative figure should be deleted to be replaced with the attached title page.

In the drawings, Sheet 1, Fig. 2, Box 204, delete "callibration" and insert -- calibration --, as shown below.

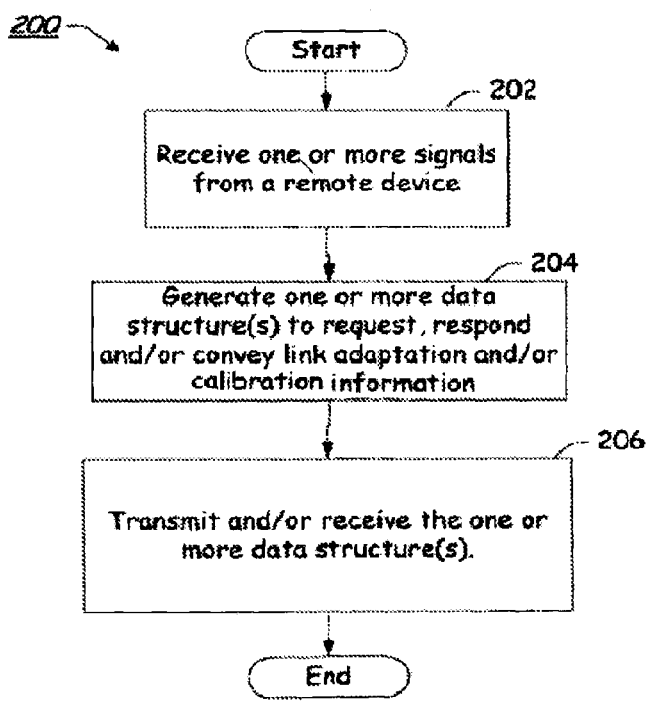

In the Claims:

In column 9, line 1, in claim 7, delete "communications" and insert -- communication --, therefor.

Signed and Sealed this
Third Day of December, 2013

Margaret A. Focarino
*Commissioner for Patents of the United States Patent and Trademark Office*

(12) United States Patent
Trainin et al.

(10) Patent No.: US 8,200,164 B2
(45) Date of Patent: Jun. 12, 2012

(54) WIRELESS COMMUNICATION SYSTEM, ASSOCIATED METHODS AND DATA STRUCTURES

(75) Inventors: Solomon Trainin, Haifa (IL); Gal Basson, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1096 days.

(21) Appl. No.: 11/292,909

(22) Filed: Dec. 1, 2005

(65) Prior Publication Data
US 2007/0129018 A1    Jun. 7, 2007

(51) Int. Cl.
*H04B 1/00* (2006.01)
*H04B 7/00* (2006.01)

(52) U.S. Cl. ............ 455/69; 455/68; 455/450; 455/441; 455/101; 370/338; 370/342; 370/349; 370/389; 370/393; 375/267; 375/347

(58) Field of Classification Search .................. 455/69, 455/441, 101, 450, 68; 370/338, 441, 442, 370/342; 375/267, 347; 348/14.09
See application file for complete search history.

(56) References Cited

U.S. PATENT DOCUMENTS

| | | | | |
|---|---|---|---|---|
| 5,862,132 A * | 1/1999 | Blanchard et al. | ............ | 370/342 |
| 5,912,887 A * | 6/1999 | Sehgal | ............ | 370/354 |
| 6,144,711 A * | 11/2000 | Raleigh et al. | ............ | 375/347 |
| 6,778,612 B1 * | 8/2004 | Lozano et al. | ............ | 375/299 |
| 7,280,625 B2 * | 10/2007 | Ketchum et al. | ............ | 375/343 |
| 7,366,245 B2 * | 4/2008 | Li et al. | ............ | 375/260 |
| 7,369,511 B2 | 5/2008 | Utsunomiya et al. | | |
| 7,417,974 B2 * | 8/2008 | Hansen | ............ | 370/334 |
| 7,486,720 B2 * | 2/2009 | Molisch et al. | ............ | 375/219 |
| 7,493,664 B2 * | 2/2009 | Riccobon | ............ | 4/420.4 |
| 7,508,778 B2 * | 3/2009 | Yafuso | ............ | 370/282 |
| 7,522,555 B2 * | 4/2009 | Li et al. | ............ | 370/329 |
| 7,555,053 B2 * | 6/2009 | Trachewsky et al. | ............ | 375/267 |
| 7,564,831 B2 * | 7/2009 | Ihm et al. | ............ | 370/349 |
| 7,564,914 B2 * | 7/2009 | Hansen et al. | ............ | 375/267 |
| 7,719,993 B2 * | 5/2010 | Li et al. | ............ | 370/252 |
| 2004/0229653 A1 | 11/2004 | Chotkowski et al. | | |
| 2005/0037799 A1 * | 2/2005 | Braun et al. | ............ | 455/525 |
| 2006/0094373 A1 * | 5/2006 | Hottinen | ............ | 455/73 |
| 2006/0111129 A1 * | 5/2006 | Ihm et al. | ............ | 455/466 |
| 2006/0146725 A1 * | 7/2006 | Li et al. | ............ | 370/252 |
| 2006/0165008 A1 | 7/2006 | Li et al. | | |
| 2006/0291544 A1 * | 12/2006 | Fischer et al. | ............ | 375/219 |
| 2007/0104129 A1 * | 5/2007 | Yang et al. | ............ | 370/329 |

(Continued)

FOREIGN PATENT DOCUMENTS
JP    2005-198213    7/2005
(Continued)

OTHER PUBLICATIONS
Gast, Matthew: "802.11 Wireless Networks: The Definitive Guide, Second Edition", pp. 311-342, XP002414302 (retrieved from the Internet: http://oreilly.com/catalog/802dot1 12 on Jan. 11, 2007).

(Continued)

*Primary Examiner* — Marceau Milord
(74) *Attorney, Agent, or Firm* — Shichrur & Co.

(57) ABSTRACT

A wireless device, a system and a method to establish a wireless communication channel with one or more remote device(s) by generating and/or receiving a protocol data unit(s) (PDU) including a control field including one or more of link adaptation control information, calibration control information and feedback request information.

19 Claims, 2 Drawing Sheets